United States Patent [19]
Lee

[11] Patent Number: 5,326,522
[45] Date of Patent: Jul. 5, 1994

[54] TREATMENT FOR TEXTURING PAPER

[76] Inventor: Ron Lee, 280 Elizabeth St., A105, Atlanta, Ga. 30307

[21] Appl. No.: 92,118

[22] Filed: Jul. 15, 1993

[51] Int. Cl.[5] .......................... D21J 3/00; B29C 53/00
[52] U.S. Cl. ..................... 264/232; 264/238; 264/294; 264/322; 264/324; 430/496; 430/538
[58] Field of Search ............... 264/86, 233, 239, 293, 264/324, 339, 232, 238, 294, 322; 493/407, 464, 467, 955; 40/158.1; 430/496, 538

[56] References Cited

U.S. PATENT DOCUMENTS

| | | | |
|---|---|---|---|
| 481,239 | 8/1892 | McEwan | 264/324 |
| 3,856,592 | 12/1974 | Giorgi | 264/293 |
| 4,721,499 | 1/1988 | Marx et al. | 264/324 |
| 4,721,500 | 1/1988 | Van Handel et al. | 264/324 |

Primary Examiner—Jan H. Silbaugh
Assistant Examiner—Christopher A. Fiorilla
Attorney, Agent, or Firm—Kennedy & Kennedy

[57] ABSTRACT

A method of forming a textured surface in a sheet of photographic paper by washing the paper for a predetermined period of time, repeatedly cockling the sheet to form a plurality of randomly placed ridges and valleys in the paper, drying the paper, and compressing the paper in a press.

7 Claims, 5 Drawing Sheets

TREATMENT FOR TEXTURING PAPER

TECHNICAL FIELD

The present invention relates to a method of forming a texture in fiber-based paper. More particularly, the present invention relates to a method of texturing photographic paper.

BACKGROUND OF THE INVENTION

Artistic works such as paintings, drawings, and photographs are often fixed on a sheet of material such as canvas, paper, or the like. The sheet of material forms a media that carries the artistic work.

Typically, the sheet is smooth or finished for receiving the artistic work. For example, canvas for painting has a roughened surface for receiving oil paint placed by the artist. Papers can be smooth or have a textured surface. The paper is textured by embossing during manufacture. Photosensitive paper for printing photographic images is provided in a number of finishes and textures. These techniques provide papers with textured surfaces.

The textured sheets presently available have minimal variation in the roughened surface. Artistically however such uniformity may fail to reflect the creativity and individuality of a work placed on the sheet. In some instances, a more richly defined texture is desirable or the artist seeks an individual unique expression of a textured surface for carrying the artist's work.

Accordingly, there is a need in the art for an improved textured paper for photographs and method of making a textured surface in a photosensitive paper.

SUMMARY OF THE INVENTION

The present invention provides a method of forming a texture in a sheet of fibrous material and particularly in a photosensitive paper. Generally described, the sheet is washed in an aqueous solution for a predetermined period of time. The sheet then is repeatedly crumpled into a spherical ball-like shape and uncrumpled, for a predetermined number of occurrences. The sheet is dried and then compressed to form a substantially planar sheet with a textured surface.

More particularly described, the sheet is washed in the aqueous solution for a predetermined period. The sheet is then crumpled loosely into a spherical ball preferably while submerged. The sheet is then uncrumpled into a planar sheet and removed from the wash. The sheet is then repeatedly crumpled and uncrumpled a predetermined number of times to form a plurality of ridges and valleys in the sheet. In one aspect of the present invention, the intensity of the crumpling increases during each subsequent occurrence. The sheet is dried. In one aspect of the present invention, the sheet is placed on a screen for air-drying. The sheet preferably billows with the puffy-like ridges and valleys forming undulating rises and rolls in the sheet. Then dried sheet is then placed in a heated press and compressed to collapse the ridges and valleys to form the textured surface in the sheet.

Objects, features, and advantages of the present invention will become apparent from a reading of the following specification, in conjunction with the drawings and appended claims.

DETAILED DESCRIPTION

Figure 1:
FIG. 1 is a plan view of a preferred embodiment of a photosensitive paper having a texture made in accordance to the present invention.
Figure 1A:
FIG. 1A is a photograph of an embodiment of the present invention illustrated in FIG. 1.
Figure 2:
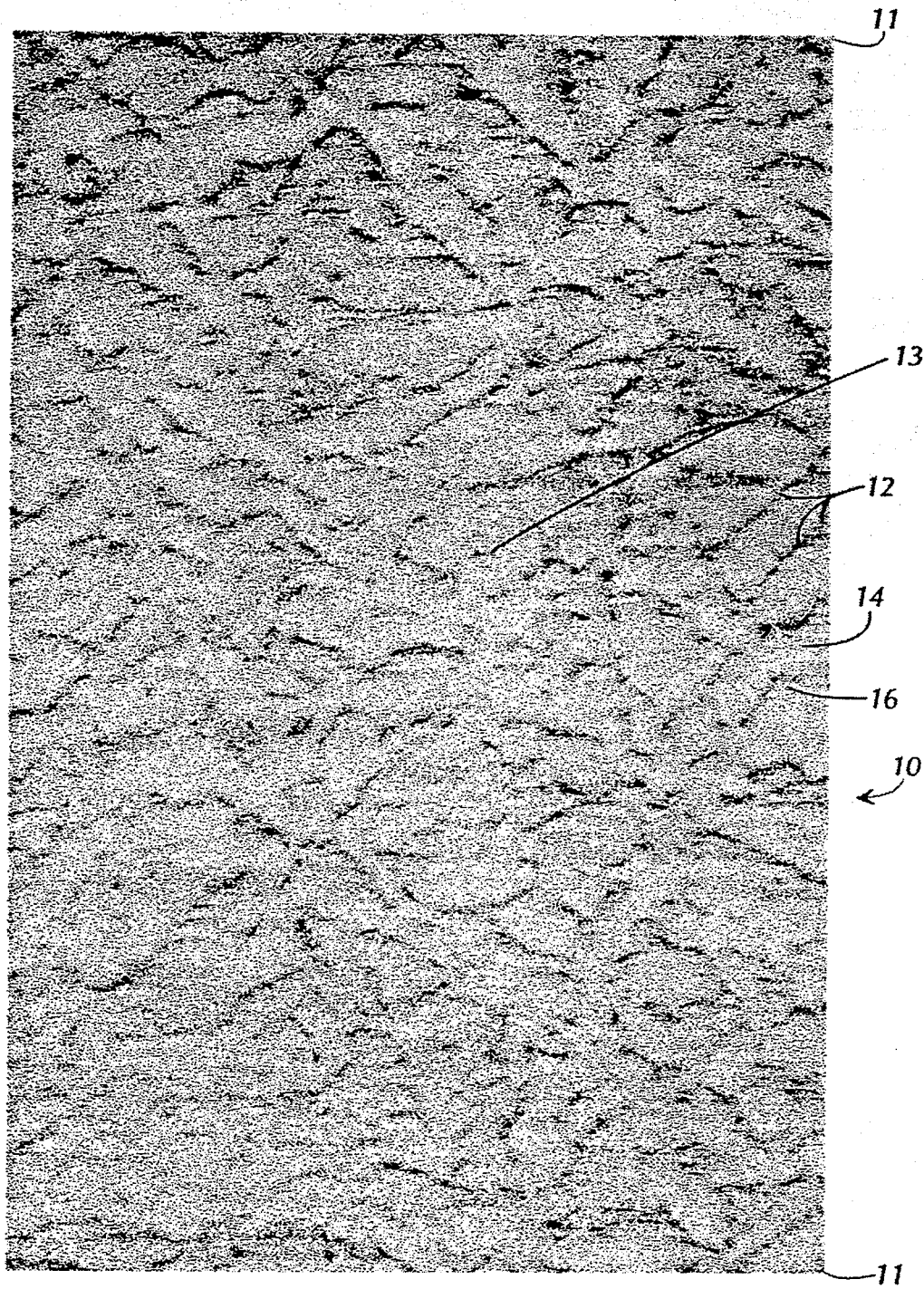
FIG. 2 is surface rubbing of the paper shown in FIG. 1 to illustrate the surface texture.

Referring now in more detail to the drawings, in which like numerals indicate like parts throughout the several views, FIG. 1 shows a photosensitive paper 10 with corners 11 and a central portion 13. FIG. 1A is a photogrpah of an embodiment of the present invention illustrated in FIG. 1. The paper 10 includes a plurality of randomly disposed creases 12 that define ridges 14 and valleys 16 in the sheet. The paper 10 is also referred to herein as a sheet. FIG. 2 is a surface rubbing of the photosensitive paper or sheet 10 to illustrate the surface texture. In a preferred embodiment, the sheet 10 is a photosensitive paper having a light-sensitive emulsion for receiving and holding a photographic image generally designated 17. The creases 12, the ridges 14, and the valleys 16 form a textured surface in the sheet 10, thereby providing a leather-like finish for the sheet. The random placement of the creases, ridges, and valleys provides an individual surface texture of artistic significance, and particularly for sheets 10 having photographic images 17.

Figure 3:
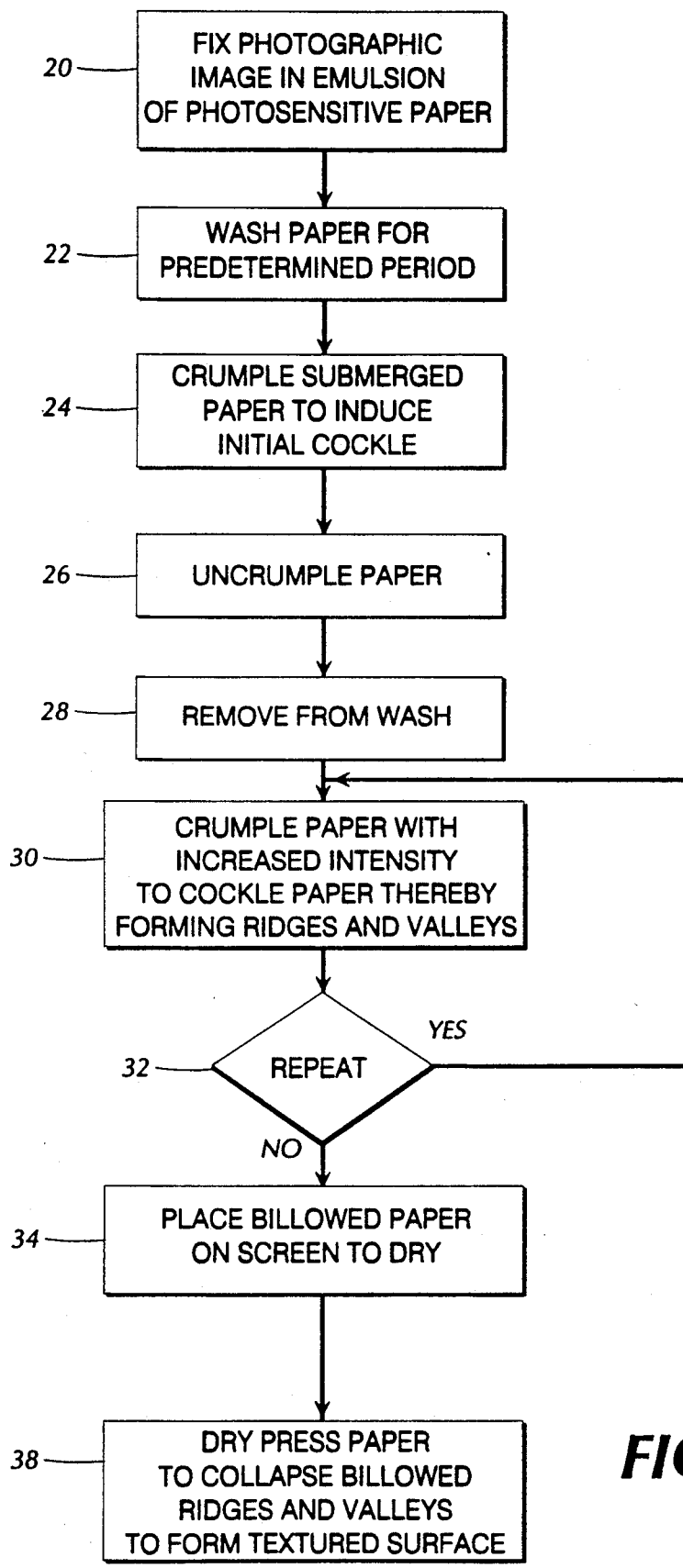
FIG. 3 is a schematic flowchart of the method of texturing photosensitive paper illustrated in FIG. 1.

The textured surface is preferably formed in the sheet 10 by manually manipulating the sheet during the cockling process of the present invention illustrated schematically in FIG. 3. In a preferred embodiment, a photosensitive paper 10 is processed 20 conventionally to create a photographic image in the emulsion of the paper. In an alternate embodiment, fibrous sheets of material are processed as discussed below to prepare sheets for receiving printing, paint, or other treatments. The photographic image is created in the photosensitive paper by exposing the sheet 10 to light passing through a negative to create a latent photographic image in the emulsion layer of the paper. The latent image is developed conventionally with developer solution to form a visual image in the emulsion. A stop solution is applied to stop the development of the visual image. A fixer solution clears the stop solution from the paper and fixes the visual photographic image in the paper. A clearer solution finishes removing the chemicals from the paper. If desired, the paper 10 is emersed in toner solution to apply a protective coating over the visual image in the paper and to enhance contrasts or provide an artistic effect to the photographic image. The paper is dried conventionally before the texturing process is commenced.

The texturing process according to the present invention cockles the paper 10 to induce a billowing or rolling character to the paper which is compressed to a leather-like surface. In a preferred embodiment, the paper is photosensitive for holding a photographic image 17 in the emulsion. Cockling provides a curled or wrinkled character to the paper 10. The cockling process characterizes the paper 10 with short choppy waves defined by the creases 12, the ridges 14, and the valleys 16 in the paper. First, the paper 10 is washed 22 in an aqueous solution for about 60 minutes. The preferred solution is water at about 68° F. plus or minus about 4° F. The wash can be continuous flow or a bath-type submergence of the paper 10.

Figure 4:
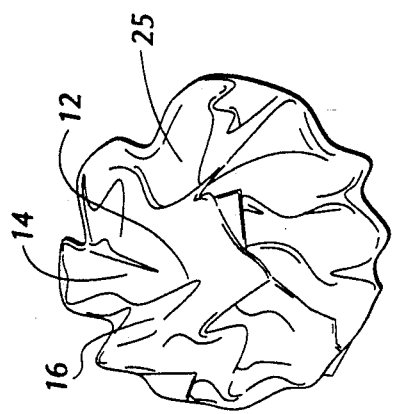
FIG. 4 is a perspective view of a balled sheet of paper for cockling according to the present invention.

The paper 10 is then loosely crumpled 24 into a spherical shaped ball 25 as illustrated in FIG. 4. In a preferred embodiment, the crumpling occurs with the paper 10 submerged in the aqueous solution of the wash. In an alternate embodiment, the paper 10 is removed from the wash before the initial crumpling. The paper 10 is crumpled manually by hand into the ball-like shape 25 by gathering and wadding the paper together loosely. This crumpling induces a cockling to the paper which develops wrinkles and short irregular waves that define some of the creases 12, the ridges 14, and the valleys 16 in the paper. The cockling provides a random distribution of the waves in the paper. For particularly large sheets, for example, 11 inch by 14 inch paper, the corners 11 can be first folded inwardly towards the central portion 13 before crumpling to facilitate holding the sheet with the hands of the artist. The cockling process of crumpling the paper preferably is continuous and quick while the paper is handled gently yet firmly to prevent damage to the emulsion layer of the photographic paper.

The ball 25 of the paper 10 is then uncrumpled 26 into a substantially planar sheet. The paper 10 is removed 28 from the wash if the initial crumpling 24 occurred with the paper 10 submerged. The paper 10 is placed on a soft absorbent toweling to remove excess water from the surface. Additional cockling is induced 30 into the paper 10 by crumpling the paper as discussed above by hand to again form the spherical ball 25. This cockling, and subsequent cockling, of the paper 10 is preferably made with increased intensity to more tightly compact the ball 25 while care is taken to avoid damage or tearing of the paper and the emulsion layer. The ball 25 is then unwrapped to return the paper 10 to a substantially planar sheet. The cockling 30 is repeated 32 for a predetermined number of occurrences. In a preferred embodiment, double weight photographic paper is used. Papers of larger sizes, for example 11 inch by 14 inch, are cockled for at least four occurrences; small sheets are adequately cockled by three occurrences. During each cockling, additional moisture is removed from the paper 10 by the handling and manipulation of the process.

Figure 5:
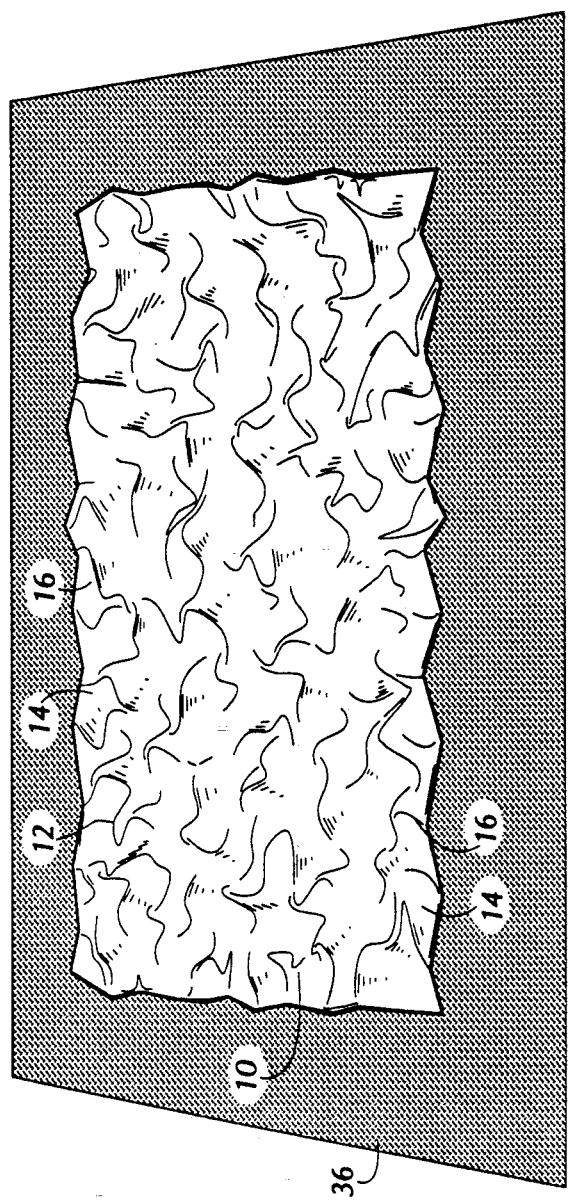
FIG. 5 is a perspective view of the paper illustrated in FIG. 4 billowed on a screen for drying.

The paper 10 is unwrapped for the final time and placed 34 on a mesh screen 36 for drying as illustrated in perspective view in FIG. 5. The cockling induces irregular waves in the paper 10 to define the creases 12, the ridges 14, and the valley 16. The waves billow in the paper 10 which has a rising or rolling appearance. The ridges 14 and the valleys 16 provide the paper 10 with an undulated character. The paper 10 is puffy and billowed for sitting on the mesh screen for drying. It is preferred that the paper 10 dry in ambient air for at least 8 hours.

The dried billowed paper 10 is then pressed 38 in a conventional dry press such as the Seal Model 210 press. The press is heated to about 250° F. plus or minus about 10° F. The paper is inserted into the press and tightly compressed for about 30 seconds. The force is released, and the paper 10 is removed, rotated over, and inserted back into the press for a second pressing for about 30 seconds. The dry press collapses the billowed ridges and valleys vertically. This substantially reduces range of the height of the ridges 14 and the depth of the valleys 16 in the paper 10 and returns the paper 10 to substantially planar sheet. Overlying portions of the paper collapse onto underlying portions. The paper 10 then has a toughened leather-like appearance, which due to the random placement of the creases 12, the ridges 14, and the valleys 16, has an individual artistic quality. The paper 10 can then be dry mounted to a backing board for rigidity and display, as is conventional with photographic works.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departing from the spirit of the invention as described by the following claims.

What is claimed is:

1. A method of forming a textured sheet of fibrous material, comprising:
   providing a substantially planar sheet of fibrous material;
   washing said sheet in an aqueous solution for a predetermined period of time;
   crumpling the sheet loosely into a substantially spherical ball;
   uncrumpling the ball to return the sheet to a substantially planar sheet;
   repeating the crumpling and uncrumpling steps a predetermined number of times to form a plurality of ridges and valleys in the sheet;
   drying the sheet; and
   compressing the sheet in a press, whereby the height of the ridges and the depth of the valleys in the sheet are reduced to provide a textured surface in the sheet.

2. The method as recited in claim 1, further comprising the step of mounting the pressed sheet on a backing board.

3. The method as recited in claim 1, wherein the first crumpling occurs with the sheet submerged in the aqueous solution.

4. The method as recited in claim 3, further comprising the steps of:
   removing the sheet from the aqueous solution; and
   removing excess aqueous fluid from the sheet, prior to subsequent crumpling and uncrumpling the sheet.

5. The method as recited in claim 1, wherein drying the sheet comprises laying the sheet in a billowed fashion on a screen to air-dry.

6. The method as recited in claim 1, wherein the intensity of crumpling increases each subsequent occurrence.

7. The method as recited in claim 1, further comprising the initial step of fixing a photographic image in an emulsion surface of the sheet.

* * * * *